United States Patent
Uchiyama (10) Patent No.: US 7,346,410 B2
(45) Date of Patent: Mar. 18, 2008

(54) METHOD AND SYSTEM FOR MANUFACTURING ELECTRONIC DEVICE, ELECTRONIC DEVICE, AND ELECTRO-OPTICAL APPARATUS

(75) Inventor: Kenji Uchiyama, Adumino (JP)

(73) Assignee: Seiko Epson Corporation (JP)

( * ) Notice: Subject to any disclaimer, the term of this patent is extended or adjusted under 35 U.S.C. 154(b) by 55 days.

(21) Appl. No.: 11/301,758

(22) Filed: Dec. 13, 2005

(65) Prior Publication Data

US 2006/0136084 A1  Jun. 22, 2006

(30) Foreign Application Priority Data

Dec. 16, 2004 (JP) ............... 2004-364098

(51) Int. Cl.
*G06F 19/00* (2006.01)
(52) U.S. Cl. ............. 700/109; 700/116; 700/226
(58) Field of Classification Search ............... 700/109, 700/115, 116, 226
See application file for complete search history.

(56) References Cited

U.S. PATENT DOCUMENTS 7,098,479 B1 * 8/2006 Yamazaki ............... 257/72
2003/0087597 A1 * 5/2003 Ohkouchi ............... 454/187
2005/0246048 A1 * 11/2005 Fetahovic ............... 700/115

FOREIGN PATENT DOCUMENTS

JP    05-309552    11/1993

* cited by examiner

*Primary Examiner*—Kidest Bahta
*Assistant Examiner*—S. S. Rao
(74) *Attorney, Agent, or Firm*—Harness, Dickey & Pierce, P.L.C.

(57) ABSTRACT

A system for manufacturing an electronic device having a processing unit which includes a timer that processes a plurality of lots each having a plurality of work pieces and measuring in units of lots a processing time of the work pieces constituting the respective lots, an environmental information measurement module that measures environmental information corresponding to the processing time of the work pieces measured in units of lots, and a communication module for transmission and reception, and a work information management unit having a storage module which is provided to correspond to each lot, communicates with the communication module of the processing unit, and receives and stores the processing time and the environmental information of the work pieces of the lot.

11 Claims, 10 Drawing Sheets

FIG. 2

FIG. 3
STORAGE UNIT OF IC TAG

|  | LOT NUMBER | THE NUMBER OF SUBSTRATES | PROCESSING TIME | POWER |
|---|---|---|---|---|
| SPUTTERING DEVICE | 1 | 20 | | |
| ETCHING DEVICE | | | | |
| ⋮ | | | | |

FIG. 8
STORAGE UNIT OF R/W

| LOT IDENTIFI-CATION NUMBER | ETCHING DEVICE | | | | | SPUTTERING DEVICE | | | | | DAILY TOTAL |
|---|---|---|---|---|---|---|---|---|---|---|---|
| | PER LOT | | | PER SUBSTRATE | | PER LOT | | | PER SUBSTRATE | | |
| | PROCESS-ING TIME | POWER | THE NUMBER OF SUBSTRATES | PROCESS-ING TIME | POWER | PROCESS-ING TIME | POWER | THE NUMBER OF SUBSTRATES | PROCESS-ING TIME | POWER | |
| LOT 1 | | | | | | | | | | | ⋯ |
| LOT 2 | | | | | | | | | | | ⋯ |
| LOT 3 | | | | | | | | | | | ⋯ |
| ⋯ | ⋯ | ⋯ | ⋯ | ⋯ | ⋯ | ⋯ | ⋯ | ⋯ | ⋯ | ⋯ | ⋯ |
| ALL LOTS | | | | | | | | | | | |

METHOD AND SYSTEM FOR MANUFACTURING ELECTRONIC DEVICE, ELECTRONIC DEVICE, AND ELECTRO-OPTICAL APPARATUS

BACKGROUND

1. Technical Field

The present invention relates to a method and system for manufacturing an electronic device, to an electronic device, and to an electro-optical apparatus.

2. Related Art

Recently, effects on the environment due to the manufacture of products have been of increasing concern. In order to achieve harmony with the environment, for example, 'Energy saving', 'Resource saving', and 'Waste reduction' have to be achieved. 'Energy saving' implies, for example, reduction in power consumption. 'Resource saving' implies, for example, reduction in paper consumption. 'Waste reduction' implies, for example, paper recycling. Among them, 'energy saving' is becoming the most important issue.

In order to achieve 'energy saving', environmental load data, such as power consumption per product, needs to be collected upon manufacturing or supplying products. Accordingly, it is possible to achieve 'energy saving' by determining the power consumption per product until the product is completed or the power consumption per product in each device, thereby optimizing and improving the process management.

In order to collect the environmental load data for each product, each product needs to be identified in a manufacturing stage, and the environmental load data for each product in each processing apparatus needs to be collected. In order to identify the individual products, the following known methods have been employed:

First, a barcode serving as an information recording medium, has been used to identify individual products. With barcodes attached on the individual products, information concerning the products can be easily read by using a barcode reader. Accordingly, it is possible to manage the information using a computer.

As an alternative approach, some documents (for example, JP-A-1993-309552) disclose that work identification information is affixed to the surface of a liquid crystal panel by cutting small notches on the side surface of the LCD panel or by directly marking ID information on the glass surface of the liquid crystal by means of laser processing, etc., and the work ID information affixed to the surface of the LCD panel is scanned with an optical sensor or by other means for identification of the LCD panel, whereby the LCD panel process control system disclosed in the document achieves unified control of the LCD panels and work ID information.

However, the following problems are present in methods disclosed in JP-A-1993-309552:

(1) In the above method, it is possible to identify and manage individual products. However, there is a problem in that it is not possible to maintain collected environmental load data in the case of collecting the environmental load data according to each product in a processing apparatus.

(2) Barcodes attached to the individual products may be detached from the products when the products are processed under a high-temperature environment in a process of manufacturing an electronic device.

Accordingly, it is difficult to use the environmental load data after measuring the environmental load data for each product in each processing apparatus and saving the measured environmental load data for later use.

SUMMARY

An advantage of some aspects of the invention is that it provides a method and system for manufacturing an electronic device, an electronic device, and an electro-optical apparatus, which can collect the environmental load data for each product.

According to an aspect of the invention, a system for manufacturing an electronic device includes: a processing unit which includes a timer for processing a plurality of lots each having a plurality of work pieces and measuring in units of lots a processing time of the work pieces constituting the respective lots, an environmental information measurement module for measuring environmental information corresponding to the processing time of the work pieces measured in units of lots, and a communication module for transmission and reception; and a work information management unit having a storage module which is provided to correspond to each lot, communicates with the communication module of the processing unit, and receives and stores the processing time and the environmental information of the work pieces of the lot.

According to the aspect, it is possible to measure a processing time of a processing unit in units of lots each of which stores a plurality of work pieces, and measure environmental information corresponding to the processing time. In addition, it is possible to transmit the processing time and the environmental information measured in units of lots to the work information management unit provided corresponding to each lot, and to store them in the storage module of the work information management unit. That is, it is possible to store the unique information of the measured lot in the work information management unit which accompanies the lot by one to one.

Accordingly, for example, it is possible to utilize the processing time stored in the work information management unit and the environmental information as environmental load data as followings. In the invention, the environmental load data implies 'environmental information'. In addition, 'Lot identification number', 'Number of substrates', and 'Processing time' are parameters required to calculate the environmental load data:

(1) It is possible to acquire the environmental load data every day in units of lots, products, and apparatus. Accordingly, for example, when the daily environmental load data is different from another according to units of the lots, it is possible to analyze the cause of the difference and optimizes the process;

(2) It is possible to compare the environmental load data between a new product and an old product in units of the products. Accordingly, it is possible to display the performance of new products compared to old products to users;

(3) It is possible to improve the process. For example, it is possible to analyze how the environmental load data can change when a single step of a manufacturing process is omitted or added so as to improve the process; and (4) It is possible to compare the environmental information between different regions. For example, when the same device is employed both factories installed in Japan and another country, it is possible to collect in units of products the environmental load data of each product in each factory. Accordingly, it is possible to analyze problems caused by a regional difference, thereby improving the process and reducing the environmental load.

In the system for manufacturing an electronic device, the storage module of the work information management unit may store unique lot identification information, and information concerning the number of work pieces stored in the lot.

According to the aspect, it is possible to assign unique lot identification information to the individual lots. Accordingly, though a plurality of lots or work pieces included in the lots are simultaneously carried into the processing unit, the processing unit can identify the attribute of each lot or work piece from the lot identification information assigned to each lot. In addition, after a plurality of processing units completes the processes, it is possible to adjust and manage the information collected by the processing unit in units of lots. Further, it is possible to determine the number of saved work pieces from the work number information stored in each lot. Accordingly, it is possible to calculate the processing time and the environmental information in units of lots.

In the system for manufacturing an electronic device according to the aspect of the invention, it is preferable that the processing unit may include sensors which are provided at a carry-in inlet and a carry-out outlet to detect that the work pieces are carried in and out.

According to the aspect, the carry-in sensor can detect that the work pieces are carried into the processing unit. The carry-out sensor can detect that the work pieces are carried out from the processing unit. Accordingly, it is possible to measure, by a timer, the time when a first work piece of each lot is carried into the processing unit and the time when the last work piece of each lot is carried out from the processing unit. Accordingly, it is possible to calculate, from the carry-in time and the carry-out time, the processing time when each lot is processed in each processing unit. Similarly, it is possible to measure the power consumption, the amount of the consumed chemicals, and the amount of the consumed water, for example, on the basis of the information detected by the sensors.

In the system for manufacturing an electronic device according to the aspect of the invention, the communication module of the processing unit may detect, by the sensor, that a first work piece of the lot is carried into the processing unit, and transmit work detection information to the work information management unit, and the work information management unit may receive the work detection information, and transmit the lot identification information and the work number information to the processing unit.

According to the aspect, before starting the process, the processing unit can acquire the lot identification information concerning the lot to which the work piece carried into the processing unit belongs, and the work number information of the lot. Accordingly, even though a plurality of work pieces stored in a plurality of work pieces is consecutively carried into the processing unit, the processing unit can identify the lot to which each work piece belongs, from the lot identification information and the work number information.

In the system for manufacturing an electronic device, the processing unit may include a counter that counts the number of the work pieces processed, in which the communication module of the processing unit may detect, by the sensor, that the last work piece of the lot is carried out from the processing unit, and transmit the lot identification information, the work number information, the environmental information, and the processing time to the work information management unit, and the work information management unit may receive and store the lot identification information, the work number information, the environmental information, and the processing time in the storage module.

According to the aspect, it is possible to transmit the number of work pieces, which is counted by the counter, the environmental information and processing time, which are measured in units of lots, to the work information management unit corresponding to each lot, and store them in the work information management unit. Accordingly, it is possible to manage the environmental load data for each lot. In addition, since the processing unit transmits the environmental information together with the lot identification number, the work information management unit can determine whether or not the lot identification number is identical to the assigned lot identification number. Accordingly, it is possible to make a communication only between the lot and the work information management unit, thereby avoiding making a false transmission.

In the system for manufacturing an electronic device, the environmental information measurement module of the processing unit may include at least one of a wattmeter, which measures the power consumption in units of the lots in the processing time, a water gauge which measures the amount of the consumed water, and a chemical gauge, which measures the amount of the consumed chemicals.

According to the aspect, it is possible to measure the power consumption, the amount of the consumed water, and the amount of the consumed chemicals for each lot in each processing unit. Accordingly, it is possible to collect the environmental load data for each lot in each processing unit in many respects.

The system for manufacturing an electronic device may include a plurality of processing units which execute the same or different processing.

An electronic device includes a plurality of processing units. According to the aspect of the invention, it is possible to store the environmental load data for each lot, which is measured by using a plurality of processing units, in the work information management unit which is provided corresponding to each lot. That is, it is possible to store the environmental load data for each processing unit, which is required until a single electronic device is manufacture, in the work information management unit. Accordingly, it is possible to collect the environmental load data until the electronic device is manufactured.

In the system for manufacturing an electronic device, the work information management unit may be included in a flow label or a jig which is affixed to each lot.

According to the aspect, since the flow label or the jig is accompanied with the lot and is carried to each processing unit, the work information management unit also accompanies the lot and is carried to each processing unit. Accordingly, it is possible to manage the work information management unit corresponding to each lot. In the invention, it is preferable that the work information management unit includes an IC tag, an IC card, and the like.

The electronic device according to an aspect of the invention is manufactured by using the system for manufacturing the electronic device.

In addition, the electronic device according to the aspect of the invention is manufactured by using the method of manufacturing the electronic device.

Further, the electro-optical apparatus according to the aspect of the invention includes the electronic device.

According to the method of manufacturing the electronic device, it is possible to optimize manufacturing process management, thereby efficiently manufacturing the electro-optical apparatus. In addition, according to the electronic device and the electro-optical apparatus of the invention, it is possible to optimize manufacturing process management, thereby efficiently manufacturing the electronic device and the electro-optical apparatus.

In the invention, the electro-optical apparatus includes an electro-optical apparatus having an electro-optical effect in which a refractive index of a material is changed by using an electric field and a transmittance ratio of light is changed, and another electro-optical apparatus which converts an electrical energy into an optical energy. In more detail, examples of the electro-optical apparatus include a liquid crystal display device, which uses liquid crystal as an electro-optical material, an organic EL (electro-luminescence) device, which uses organic EL, an inorganic EL device, which uses inorganic EL, and a plasma display device, which uses plasma gas as an electro-optical material. Moreover, the electro-optical apparatus may include an EPD (electrophoretic display) and a FED (field emission display).

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described with reference to the accompanying drawings.

The invention describes a system for manufacturing a thin film diode (TFD) element (a system for manufacturing an electronic device) which collects data concerning environmental load, for example, upon manufacturing a TFD element that is used in a liquid crystal display device. Also, even though an actual TFD element is manufactured by performing a predetermined process using a plurality of processing devices, the present embodiment, for easy understanding of the invention, only describes a system for manufacturing the TFD element in which a single processing device (etching device) is used. Also, even though plural substrates of lots are carried into each processing device in the system for manufacturing the TFD element, the present embodiment only describes a case where a single substrate of the lot is carried into the processing device. Also, in the accompanying drawings, the individual components are drawn in different scales so that the components can be easily recognized.

Figure 1:
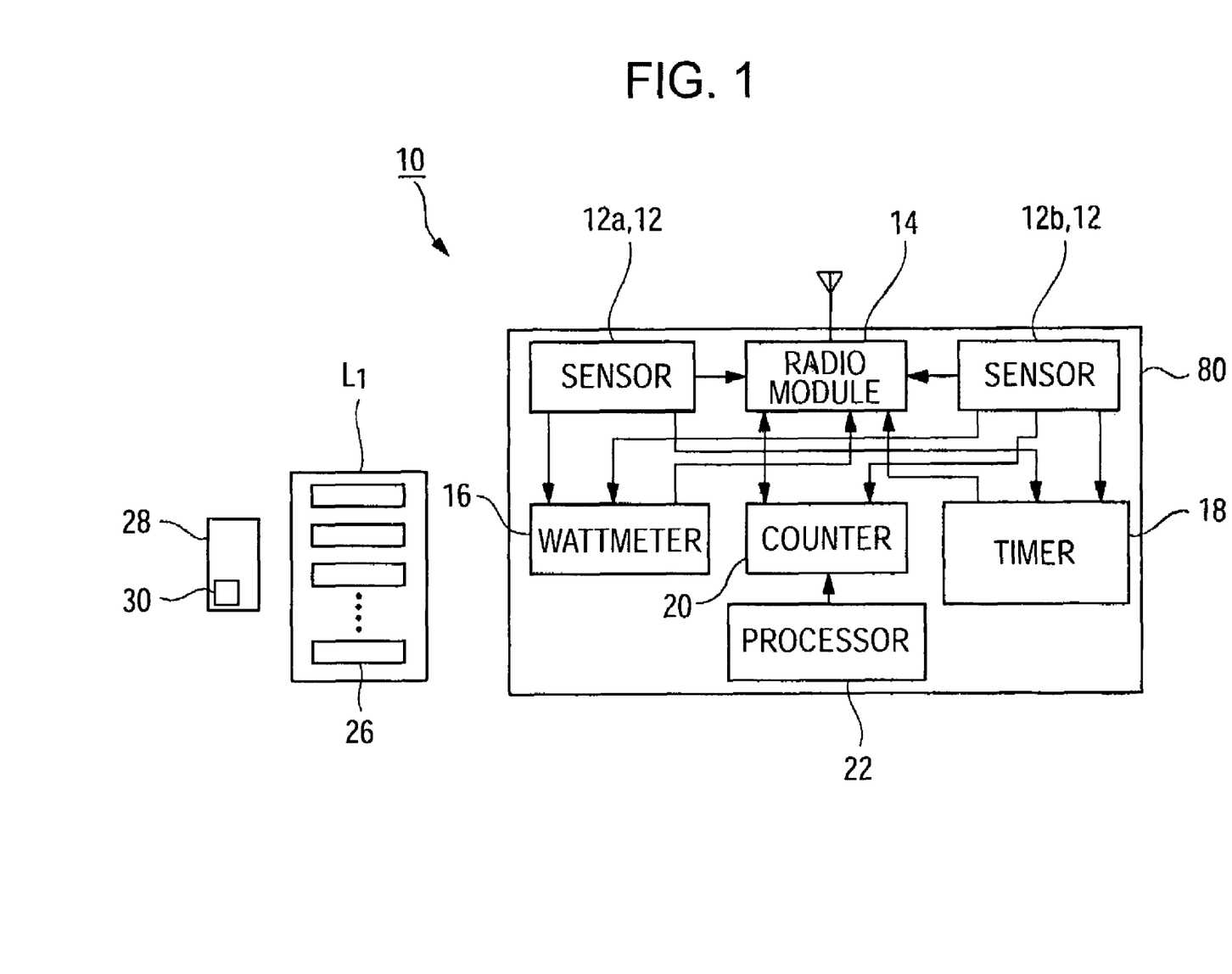
FIG. 1 is a block diagram of a TFD element system.

FIG. 1 a block diagram showing a system for manufacturing a TFD element according to the present embodiment. As shown in FIG. 1, a TFD element manufacturing system 10 includes an etching device 80, a lot $L_1$, and a flow label 28. The etching device 80 includes a plurality of sensors 12, a radio module (communication module) 14, a wattmeter 16, a counter (a counter for counting the number of work pieces) 20, a timer 18, and a processor 22. The flow label 28 includes an IC tag (work information management unit) 30.

A block configuration of the etching device 80 will be described with reference to FIG. 1. A sensor 12a is provided at a ceiling of a carry-in inlet of the etching device 80, and a sensor 12b is provided at a ceiling of a carry-out outlet of the etching device 80. In the present embodiment, the sensors 12a and 12b are, for example, infrared sensors. When a substrate (work pieces) 26 is carried into the etching device 80, the sensor 12a provided at the carry-in inlet receives infrared light of the substrate 26 at its light-receiving module and converts the light into a detection signal. The sensor 12b provided at the carry-out outlet also executes the same operation as the sensor 12a. The sensors 12a and 12b are electrically connected to the radio module 14, the wattmeter 16, the timer 18, and the counter 20. The sensors 12a and 12b transmit detection signals to the radio module 14, the wattmeter 16, the timer 18, and the counter 20.

The wattmeter 16 is provided inside the etching device 80 and measures power consumption of the lot $L_1$. The wattmeter 16 is electrically connected to the sensors 12a and 12b, and the radio module 14. The wattmeter 16 starts to measure the power consumption in response to a detection signal of the sensor 12a provided at the carry-in inlet, which indicates that the substrate 26 is carried in. The wattmeter 16 stops measuring the power consumption in response to a detection signal of the sensor 12b provided at the carry-out outlet, which indicates that the substrate 26 is carried out. Accordingly, it is possible to measure the amount of the power consumption of the lot $L_1$. In the present embodiment, the wattmeter 16 measures the entire power consumption used in controlling a high-frequency power supply, a vacuum pump, and temperature.

The timer 18 is provided inside the etching device 80, and is electrically connected to the sensors 12a and 12b, and the radio module 14. The timer 18 measures processing time of the lot $L_1$ that is processed by using the etching device 80. That is, when the sensor 12a detects that a first substrate 26 of the lot $L_1$, and the detection signal is output to the timer 18, the timer 18 measures the time when the detection signal is output as carry-in time. When the sensor 12b detects a last substrate 26 of the lot $L_1$ and the detection signal is output to the timer 18, the timer 18 measures the time when the detection signal is output as carry-out time. The timer 18 calculates the processing time of the lot $L_1$ in the etching device 80 from the measured carry-in time and carry-out time.

The counter 20 is provided in the etching device 80 and is electrically connected to the radio module 14 and the processor 22. When the detection signal (a signal detected when the substrate 26 is carried out from the etching device 80) is output from the sensor 12b provided at the carry-out outlet, the counter 20 counts the output detection signal.

Accordingly, the counter 20 can count the number of substrates 26 in each lot. When a discard signal of a substrate 26 discarded during an etching process is output from the processor 22, the counter 20 counts the discard signal.

The radio module 14 is provided in the etching device 80, and is electrically connected to the sensors 12a and 12b, the wattmeter 16, the counter 20, and the timer 18. The radio module 14 includes an antenna circuit, a control circuit, a power source circuit, a demodulation circuit, and a modulation circuit. Accordingly, the radio module 14 can transmit and receive information with the IC tag 30 provided outside the etching device 80 by using a local area wireless communication. The term "local area" indicates a much closer distance compared to a distance between a mobile station and a base station in a mobile communication system, and implies a communicable distance in a local area wireless communication using RF-ID (Radio Frequency Identification), wireless LAN (Local Area Network), Bluetooth, or infrared rays. In the present embodiment, as described below, since the IC tag 30 is attached in the flow label 28 which accompanies the lot $L_1$, the IC tag 30 is located in the local area of the radio module 14 of the etching device 80.

The lot $L_1$, the flow label 28, and the IC tag 3 will now be described with reference to FIG. 1.

As shown in FIG. 1, a plurality of substrates 26 is received in the lot $L_1$. The lot $L_1$ is accompanied by using the flow label 28. In the flow label 28, there is recorded a lot identification number of the lot $L_1$, and a recipe number of a predetermined recipe (processing sequence or processing content) including a processing method concerning control parameters (control target values such as temperature, pressure, types or rate of gas, time, or the like) which are preset for each device.

The IC tag 30 is mounted on the flow label 28. The IC tag 30 reads and writes data (information) by using an R/W unit through a non-contact communication method such as an electromagnetic induction method or a microwave method. The IC tag 30 is typically called RF-ID.

Figure 2:
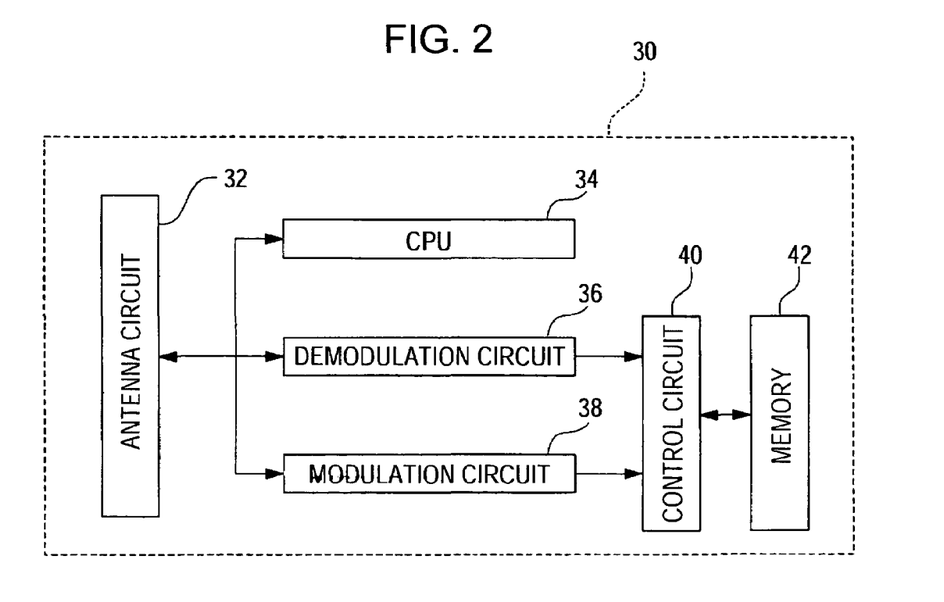
FIG. 2 is a block diagram illustrating a general construction of an IC tag.

FIG. 2 is a block diagram of the IC tag 30.

As shown in FIG. 2, the IC tag 30 includes a control circuit 40, a memory (storage unit) 42, an antenna circuit 32, a CPU 34, a demodulation circuit 36, and a modulation circuit 38. The control circuit 40 is a control unit which receives a radio wave from the radio module 14 of the etching device 80 to control the operation of the IC tag 30, and is electrically connected to the memory 42, the demodulation circuit 36, and the modulation circuit 38. The memory 42 is a non-volatile rewritable storage unit in which data is read and written by using the control circuit 40. In the present embodiment, an electromagnetic induction type IC tag 30 with a communication range of several meters is employed. In more detail, a frequency range such as 135 KHz, 13.56 MHz, or 2.45 GHz can be used for communication between the radio module 14 of the etching device 80 and the IC tag 30. Further, when UHF ranges are used, a communication distance between the radio module 14 of the etching device 80 and the IC tag 30 can become greater.

Subsequently, a data structure of the memory 42 of the IC tag 30 will be described with reference to FIG. 3.

The memory 42 stores a list of devices that are used until the TFD element is manufactured. For example, a 'sputter device' for forming a TaW film on the substrate 26 by using a sputtering technique, an 'etching device' for patterning the TaW film in a predetermined pattern, and the like are listed in an order to be used. For each device (for example, 'sputter device' and the like), items such as 'Lot identification number', 'Number of substrates', 'Processing time', and 'Consumption power' are listed. The 'Lot identification number' indicates a unique identification number for identifying a plurality of lots Li, which is assigned to each lot Li. The 'Number of substrates' indicates the number of substrates 26 which are received in each lot Li. The 'Processing time' and the 'Consumption power' have been already described above. Accordingly, it is possible to determine the 'Processing time' and the 'Consumption power' which are required in each device for each lot.

Subsequently, a method of manufacturing a TFD element using the TFD element manufacturing system according to the present embodiment will now be described with reference to FIGS. 4 and 5.

Figure 4:
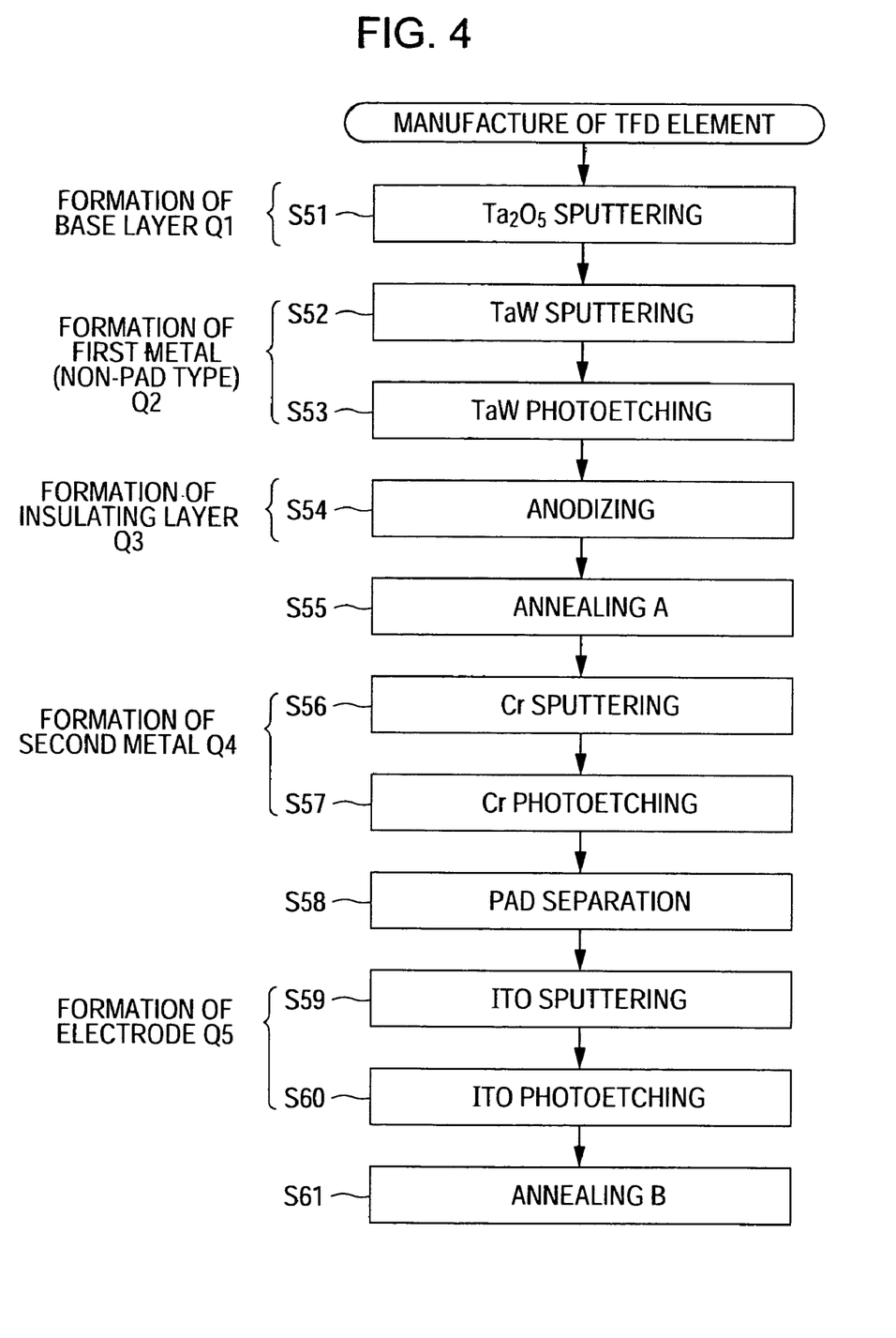
FIG. 4 is a flow chart of a process for manufacturing a TFD element.

FIG. 4 is a flow chart showing a process of manufacturing a TFD element according to the present embodiment. Since the method of manufacturing the TFD element is the same as the related art, a detailed description thereof will thus be omitted herein. A system for manufacturing the TFD element at the process of manufacturing a part of the TFD element (TaW photoetching process (step S53) of FIG. 4) will be described. Even though a plurality of lots Li is carried into each device, the present embodiment describes a case where a lot $L_1$ of the lots Li is carried in.

Figure 5:
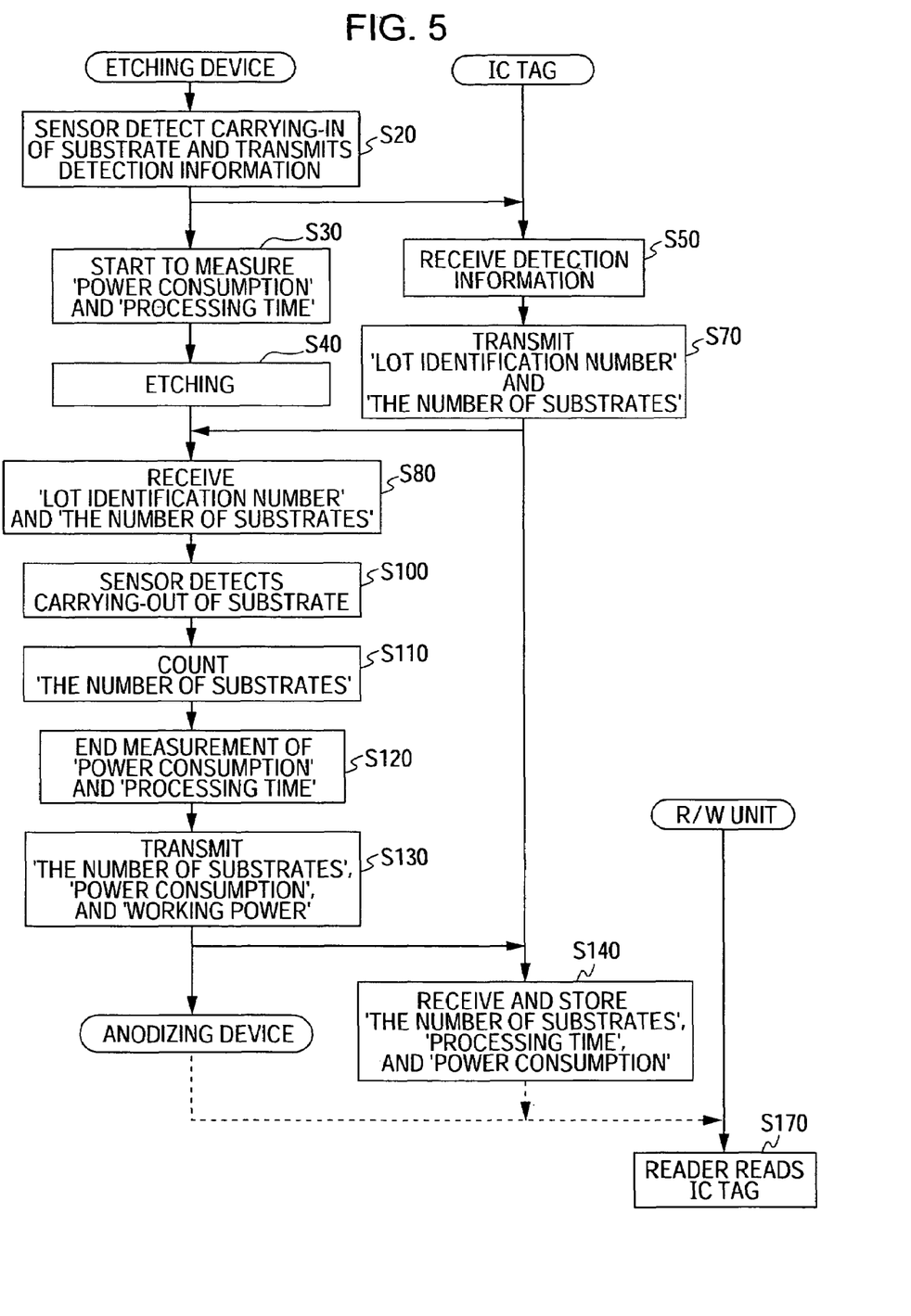
FIG. 5 is a flow chart of the operation of a TFD element manufacturing system.

FIG. 5 is a flow chart of the operation of the etching device 80 and the IC tag 30 according to the present embodiment.

First, after the lot $L_1$ is subjected to a sputtering process by using a TaW sputter device in the previous operation (step S52) of FIG. 4, the lot $L_1$ is carried into a loader of the etching device 80. The substrates 26 received in the lot $L_1$ are sequentially carried by using the loader into the etching device 80 starting from the lot $L_1$. When the sensor 12a provided in the etching device 80 detects a substrate 26 of the lot $L_1$ which is first carried into the etching device 80, the sensor 12a transmits a detection signal to the radio module 14. The radio module 14 transmits the detection signal to the IC tag 30 (step S20).

When the IC tag 30 receives the detection signal from the etching device 80 (step S50), the IC tag 30 reads the 'Lot identification number' and the 'Number of substrates' which are stored in the memory 42, and retransmits the 'Lot identification number' and the 'Number of substrates' to the etching device 80 (step S70). In more detail, since the attribute of the lot $L_1$ which is currently processed in the etching device 80 is '1', the 'Lot identification number' is '1'. Since twenty substrates 26 are stored in the lot $L_1$, 'Number of substrates' is '20'. Accordingly, the IC tag 30 transmits the 'Lot identification number 1' and the 'Number of substrates 20' to the etching device 80.

The etching device 80 receives the 'Lot identification number 1' and the 'Number of substrates 20', which are output from the IC tag 30, (step S80) and transmits them to the counter 20.

When the detection signal is transmitted from the sensor 12a, the timer 18 of the etching device 80 measures the detected time. In the present embodiment, the detected time is set to a carry-in time (step S30). Similarly, when the detection signal is output from the sensor 12a, the wattmeter 16 measures the power consumption of the etching device 80 (step S30). That is, the wattmeter 16 starts to measure the power consumption of the etching device 80 on the basis of the carry-in time of the first substrate 26 of the lot $L_1$.

Figure 6:
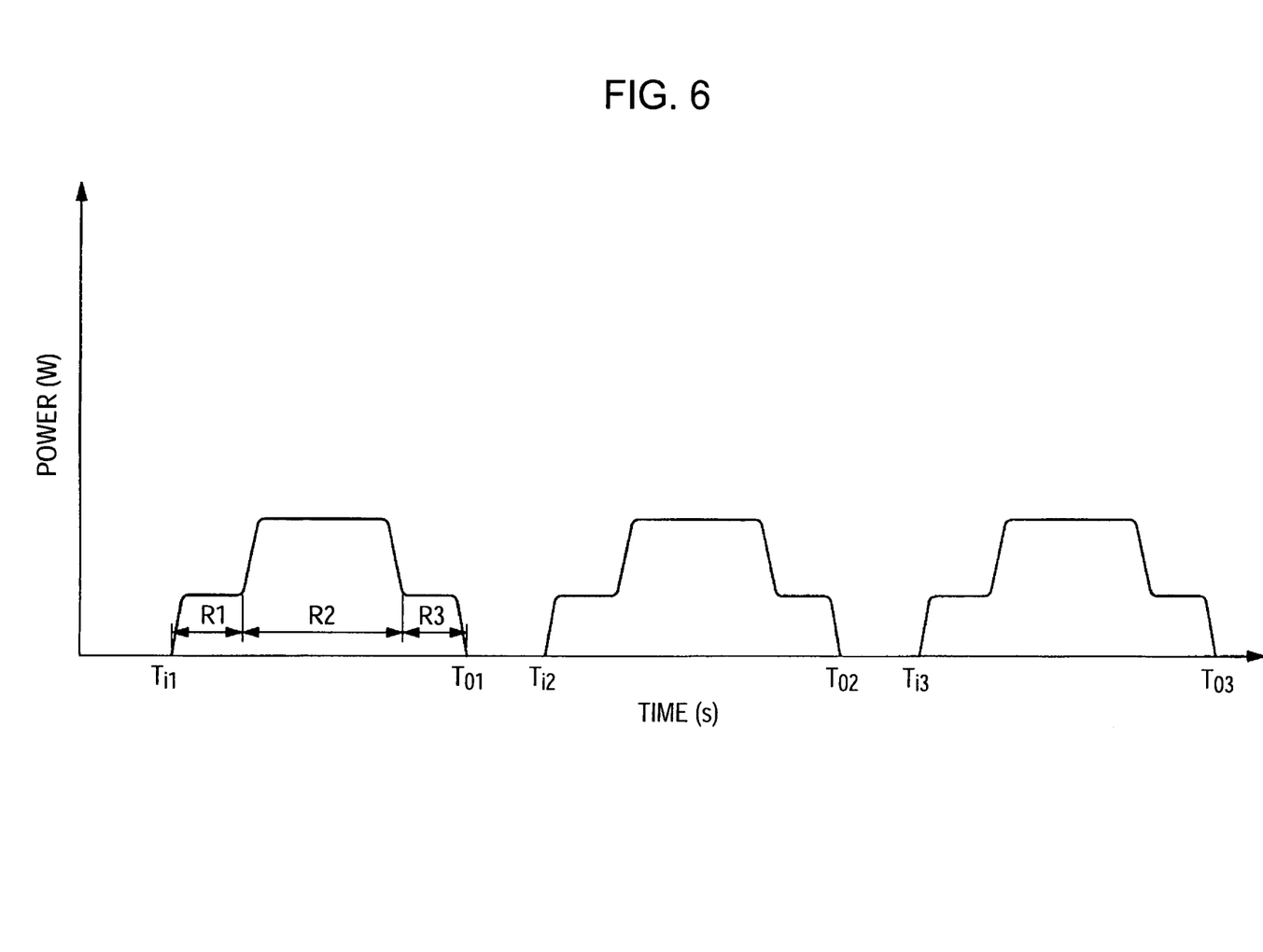
FIG. 6 is a graph showing the power consumption of each lot in an etching processing device.

FIG. 6 is a graph showing a relation between the processing time of each lot Li (i=1, 2, 3, ...) and the power consumption based on the processing time in the etching device 80 according to the present embodiment. In more detail, $T_{in}$ indicates a carry-in time of each lot $L_1$ and $T_{on}$ indicates a carry-out time of each lot L. The vertical axis of FIG. 6 indicates the power consumption of the etching device.

As shown in FIG. 6, the wattmeter 16 starts to measure the power consumption on the basis of the carry-in time $T_{i1}$ on which a first substrate 26 belonging to the lot $L_1$ is detected by using the sensor 12a. In a period R1 of FIG. 6, the substrate 26 is carried into the etching device 80, but a process for the substrate 26 is not initiated. In this period R1, power is consumed since a vacuum pump for exhausting the etching device 80 and a carrier for carrying the substrate 26 are driven.

Next, when the substrate is carried into the etching device 80, the processor 22 of the etching device 80 uses a photoresist, which is patterned in a predetermined pattern, as a mask to perform a dry-etching process (step S40). The wattmeter 16 continues to measure the power consumption during the etching process. As shown in FIG. 6, when the substrate 26 begins to be subjected to the etching process, more power is consumed since a high frequency voltage is output to an electrode part, causing the power consumption in the period R2 to increase.

In addition to the etching process, when a sheet of the substrate 26 is, for example, damaged during the etching process, the processor 22 discards the damaged substrate 26. The processor 22 transmits a discard signal to the counter 20. When the counter 20 receives the discard signal from the processor 22, the counter 20 subtracts the number of discarded substrates from 'Number of substrates' which is received from the IC tag 30. That is, the counter 20 writes 'Number of substrates 19' instead of 'Number of substrates 20'. Accordingly, the counter 20 can determine the number of substrates 26 which are processed in the etching device 80.

After the processor 22 terminates the etching process, a plurality of substrates 26 belonging to the lot $L_1$ is sequentially carried out from the etching device 80. The sensor 12b detects the carried substrates 26 one by one, and transmits a detection signal to the counter 20 (step S100). The counter 20 counts the detection signal which is output from the sensor 12b. The counter 20 recognizes 'Number of substrates' to be '19' from the discard signal output from the processor 22 during the etching process. Accordingly, the counter 20 counts the detection signal on the basis of the detection signal output from the sensor 12b. After detecting the detection signal nineteen times, the counter 20 transmits the detection signal to the timer 18 and the wattmeter 16. That is, after the substrate 26 received in the lot $L_1$ is subjected to processes in the etching device 80, the counter 20 notifies the timer 18 and the wattmeter 16 that the processes for the lot $L_1$ in the etching device 80 are terminated.

When the sensor 12b detects that a last substrate 26 belonging to the lot $L_1$ is carried out, a detection signal is output from the counter 20 to the timer 18. The timer 18 measures the time when the detection signal is output (step S120). In the present embodiment, the detection time is set to a carry-out time. The timer 18 calculates a processing time of the etching device 80 of the lot $L_1$ from the carry-in time and the carry-out time, and transmits the calculated processing time to the radio module.

In addition, when the sensor 12b detects that the last substrate 26 of the lot $L_1$ is carried out, a detection signal is output from the counter 20 to the wattmeter 16. The wattmeter 16 stops measuring the power consumption of the etching device 80 (step S120). That is, the wattmeter 16 terminates measuring the power consumption of the etching device 80 on the basis of a carry-out time of the last substrate 26 of the lot $L_1$. Also, the wattmeter 16 calculates the total power consumption per processing hour of the lot $L_1$, and transmits the calculated total power consumption to the radio module.

As shown in FIG. 6, the wattmeter 16 stops measuring the power consumption on the basis of the carry-out time $T_{o1}$ on which the sensor 12b detects the last substrate 26 belonging to the lot $L_1$. In the period R3 as shown in FIG. 6, power is consumed since the substrate 26 is still in the etching device 80 and the vacuum pump is still operating even though processes in the etching device 80 are terminated. When the wattmeter 16 stops measuring the power consumption, the power consumption becomes zero. The processing time T is equal to $T_{o1}$-$T_{i1}$, as shown in FIG. 6. Accordingly, the power consumption in the etching device 80 of the lot $L_1$ is equal to the total sum of power consumed during the time from the carry-in time $T_{i1}$ to the carry-out time $T_{o1}$. Accordingly, in the present embodiment, it is possible to measure in units of lots the power consumption in the etching device 80 during the processing time.

When the number of counts of the detection signal output from the sensor 12b is equal to the 'Number of substrates' (the updated 'Number of substrates' when the number of substrates is updated during process) output from the IC tag, the counter 20 recognizes a substrate 26 subsequently carried into the etching device 80 as a substrate 26 which belongs to a new lot other than the lot $L_1$.

In more detail, when a substrate 26 belonging to a lot $L_2$ is carried into the etching device 80, the sensor 12a detects that the substrate 26 is carried in, and transmits a detection signal to the radio module 14. The radio module 14 transmits the detection signal to the IC tag 30 which is mounted on the flow label 28 of the lot $L_2$. When receiving the detection signal, the IC tag 30 of the lot $L_2$ reads the 'Lot identification number 2' and the 'Number of substrates 20' from the memory 42, and transmits this information to the etching device 80. The etching device 80 receives the 'Lot identification number 2' and the 'Number of substrates 20' and transmits this information to the counter 20. Accordingly, the counter 20 identifies the attribute of a new lot which is carried into the etching device 80.

Next, the radio module 14 of the etching device 80 transmits the 'Lot identification number' of the lot $L_1$, the measured the 'Number of substrates' of the lot $L_1$, the 'Processing time' of the lot $L_1$, and the 'Power consumption' of the lot $L_1$ to the IC tag 30 (step S130).

The IC tag 30 receives the 'Lot identification number', the 'Number of substrates' of the lot $L_1$, the 'Processing time' of the lot $L_1$, and the 'Power consumption' of the lot $L_1$ (step S140). The IC tag 30 determines whether or not a unique 'Lot identification number', which is assigned thereto, is equal to the received 'Lot identification number'. When they are equal to each other, the received information is stored in the memory 42. On the other hand, when they are not equal to each other, the received information is discarded. In the present embodiment, since the 'Lot identification number' which is assigned to the IC tag 30 and the received 'Lot identification number' are '1', the received information is stored in the memory 42.

Figure 3:
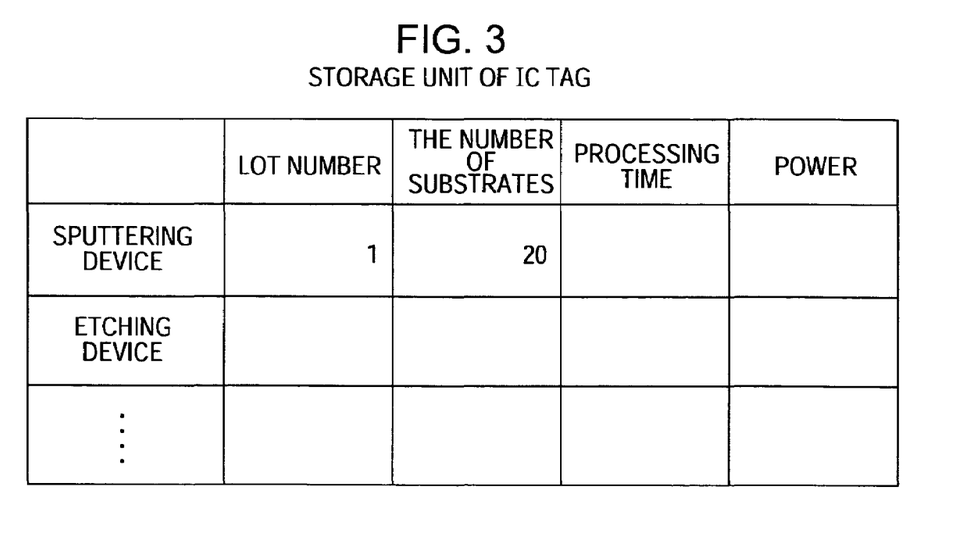
FIG. 3 is a view of a data structure of a memory of an IC tag.

The IC tag 30 stores 'Number of substrates 20' of the lot L1, the 'Processing time' of the lot L1, and the 'Power consumption' of the lot L1 in corresponding attributes of the 'Etching device' of the memory 42 shown in FIG. 3. The memory 42 of the IC tag 30 already stores data concerning environmental load measured in a sputter device during the TaW sputtering process which is shown in FIG. 4.

Next, when the process in the etching device 80 is terminated, the substrate 26 is subjected to an anodizing process which is shown in FIG. 4 (step S54 of FIG. 4). An anodizing device measures various information concerning the lot $L_1$ (for example, the 'Power consumption' and the like), and transmits the measured information to the IC tag 30 which corresponds to the lot $L_1$. The IC tag 30 stores the information concerning the lot $L_1$ in the memory 42. In the TFD element manufacturing system according to the present embodiment, such an operation is repeatedly performed in each device which is used in the TFD element manufacturing process (steps S55 to S61 in FIG. 4). Accordingly, it is possible to store in the IC tag 30 the data concerning the environmental load in the processing devices in the entire processes for the lot $L_1$.

Next, as shown in FIG. 5, after terminating the entire manufacturing process of the TFD element, the IC tag, which is mounted on the flow label 28 of the lot $L_1$, is read by using an R/W unit 50 (step S170). The R/W unit 50 is provided in parallel with an annealing B device which performs step S61 of the TFD element manufacturing process in FIG. 4. After terminating the annealing B process, i.e., after terminating the TFD element manufacturing process, various information in the memory 42 of the IC tag 30 can be read.

Figure 7:
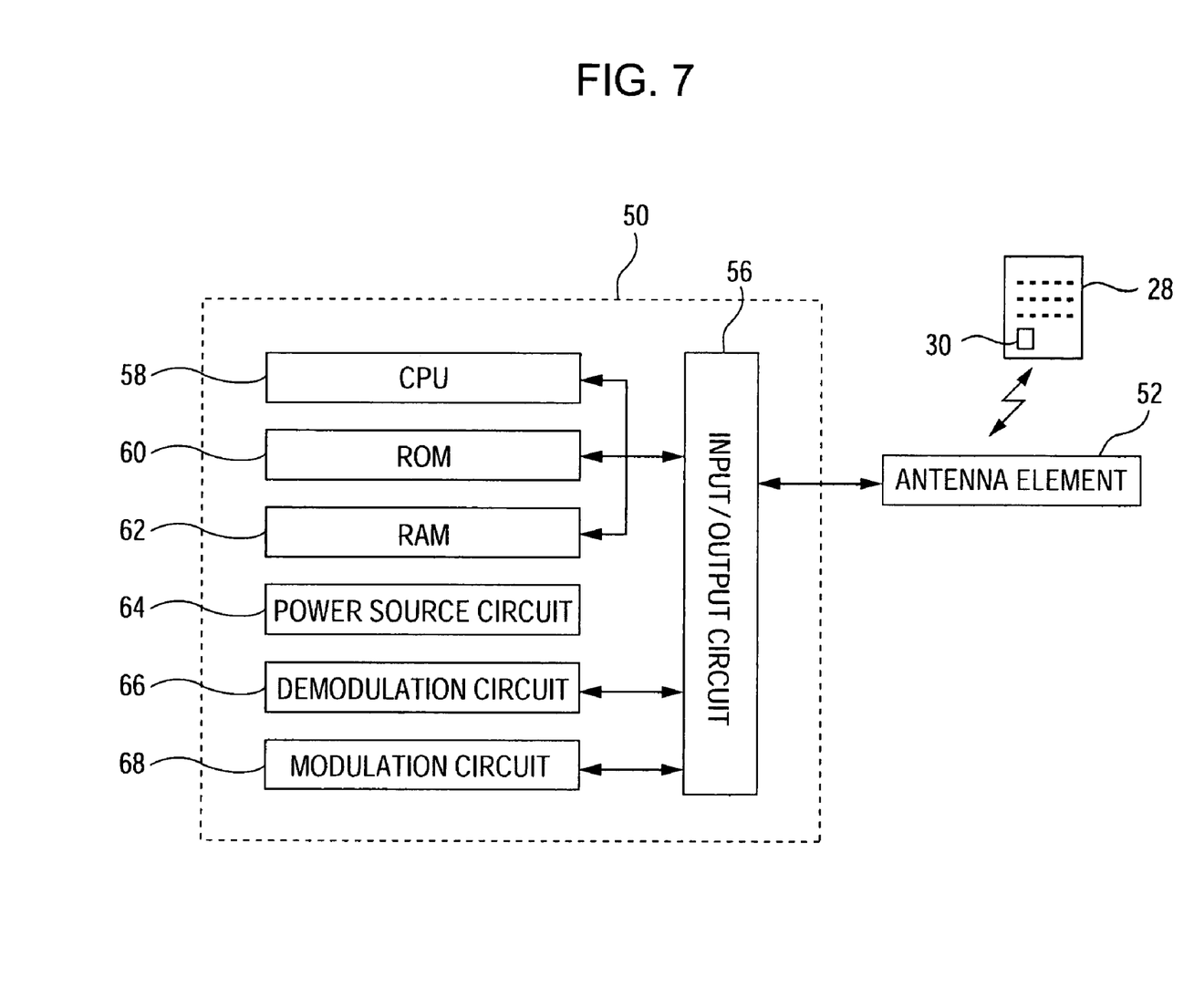
FIG. 7 is a block diagram illustrating a general construction of an R/W unit.

The R/W unit 50, which reads the information stored in the IC tag 30, will now be briefly described.

FIG. 7 is a block diagram of the R/W unit 50. As shown in FIG. 7, the R/W unit 50 includes a CPU 58, a ROM 60, a RAM 62, an input/output circuit 56, a power source circuit 64, a demodulation circuit 66, and a modulation circuit 68. The CPU 58, the ROM 60, and the RAM 62 are connected via a bus to one another. The bus is also connected to the input/output circuit 56. The input/output circuit 56 is connected to an antenna element 52 via a cable 54.

The CPU 58 is an operation unit for controlling the R/W unit 50, and the ROM 60 is a non-rewritable and non-volatile memory 42 which stores control programs executed by using the R/W unit 50 or various fixed value data. The RAM 62 is a rewritable volatile memory 42 for temporarily storing various data when each operation of the R/W unit is executed. The RAM 62 also temporarily stores data concerning the environmental load which is read from the IC tag 30. In addition, the R/W unit is always equipped with the power source circuit 64 which supplies a required power to each part. The demodulation circuit 36 demodulates an electromagnetic signal (analog signal) received by using the antenna module 52 into original data (digital signal) such as an identification code. The modulation circuit 68 modulates environmental load data (digital signal) output to the IC tag 30 into an electromagnetic signal (analog signal) and outputs it to the antenna module 52.

Next, operation for reading the information stored in the IC tag 30 into the R/W unit 50 will be described.

The environmental load data stored in the IC tag 30 is read by using non-contacting/contacting the flow label 28 accompanying the lot $L_1$ to the R/W unit 50. The reading operation may be performed by using an operator or a machine. In more detail, the R/W unit 50 makes the antenna module 52 transmit an electromagnetic wave having a predetermined frequency (for example, 13.56 MHz). When the IC tag 30 mounted on the flow label 28 receives the electromagnetic wave, an induced voltage is generated on the antenna circuit 32 and the IC tag 30 starts to operate by using the induced voltage. The IC tag 30 reads the 'Lot identification number', the 'Number of substrates', the 'Processing time', and the 'Power consumption', which are output to the R/W unit 50, from the memory 42.

Figure 8:
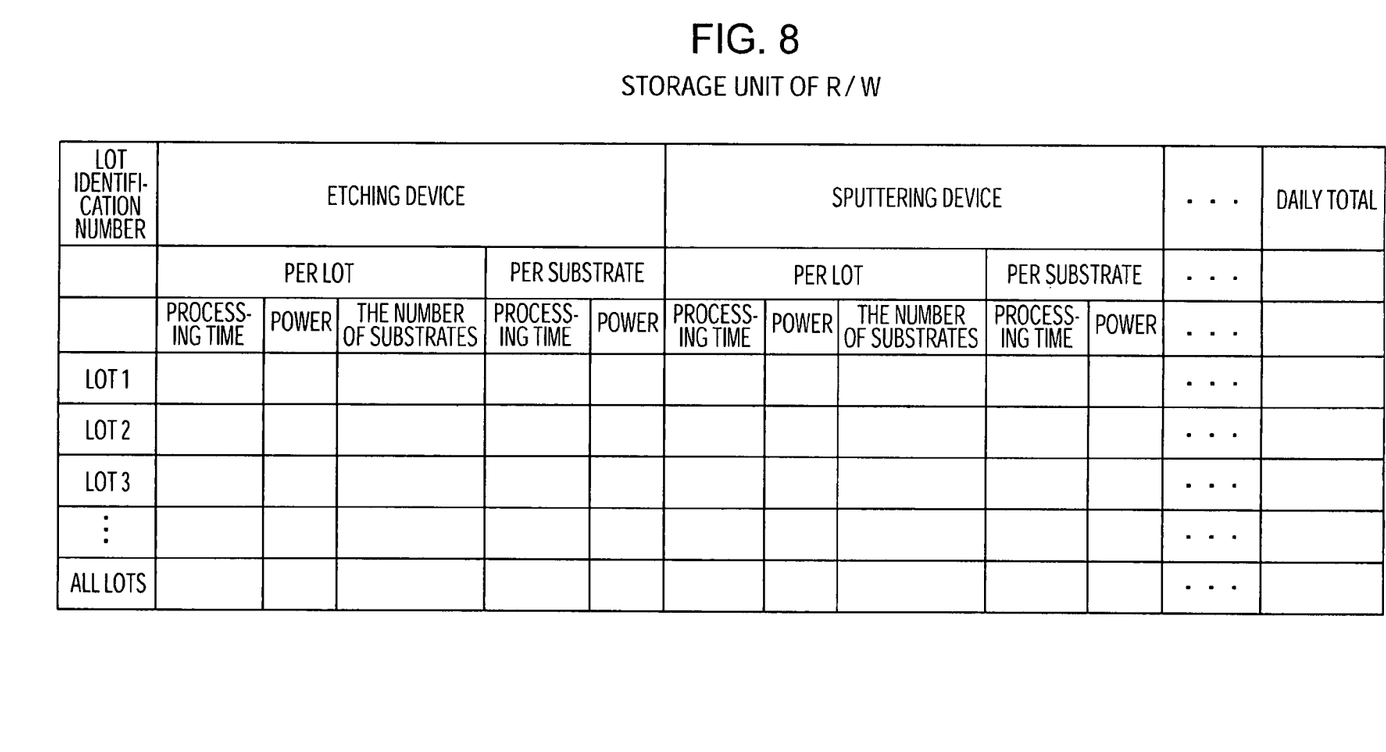
FIG. 8 is a view of a data structure of a memory of an R/W unit.

The RAM 62 stores the 'Lot identification number', the 'Number of substrates', the 'Processing time', and the 'Power consumption' corresponding to the lot $L_1$, which are wirelessly output from the IC tag 30. FIG. 8 is a data structure of the RAM 62 of the R/W unit 50. In the present embodiment, '1' to '100' are sequentially stored in the 'Lot identification number' of the memory 42 beforehand. Accordingly, when the received the 'Lot identification number' is '1', the RAM 62 stores received information in the 'Number of substrates', the 'Processing time', and the 'Power consumption' of the 'Etching device' which corresponds to '1' of the 'Lot identification number' of the RAM 62. For example, '19' is stored in the 'Number of substrates' of the 'Etching device'.

The CPU 58 calculates the 'Power consumption per substrate' of each processing device from the 'Number of substrates' and the 'Power consumption' in the received lot $L_1$. Similarly, the CPU 58 calculates the 'Processing time per substrate' of each processing device from the 'Number of substrates' and the 'Processing time'. The CPU 58 sums up the 'Power consumption per substrate' of the entire processing devices of the lot $L_1$ using the 'Power consumption per substrate' of each processing device, and calculates the 'Power consumption' which is required to manufacture a single TFD element. Similarly, the CPU 58 calculates the 'Processing time' which is required to manufacture a single TFD element. In addition, the CPU 58 can calculate the 'Power consumption' per day and the 'Processing time' per day in each processing device, and calculate the 'Power consumption' per day and the 'Processing time' per day in a factory. The CPU 58 stores the calculated information in the RAM 62.

According to the present embodiment, it is possible to measure the 'Processing time' of the etching device 80 and the 'Power consumption' corresponding to the processing time in units of lots in which a plurality of substrates 26 is stored. Also, it is possible to transmit the measured 'Processing time' and the 'Power consumption' of each lot to the IC tag 30, which is provided corresponding to each lot, and to store the 'Processing time' and the 'Power consumption' in the memory 42 of the IC tag 30. That is, it is possible to store the unique information of the measured lot L in the IC tag 30 which accompanies the lot L as one-to-one.

According to the present embodiment, for example, it is possible to utilize the 'Processing time' and the 'Power consumption', which are stored in the IC tag 30, as environmental load data like the following. In the present embodiment, the environmental load data is construed to comprehend the 'Lot identification number', the 'Number of substrates', the 'Processing time', and the 'Power consumption':

(1) It is possible to acquire the environmental load data every day in units of lots, products, and apparatus. Accordingly, for example, when the daily environmental load data is different from another according to units of the lots, it is possible to analyze the cause of the difference and thus optimizes the process;

(2) It is possible to compare the environmental load data between a new product and an old product in units of the products. Accordingly, it is possible to display the performance of new products compared to old products to users;

(3) It is possible to improve the process. For example, it is possible to analyze how the environmental load data can change when a single step of a manufacturing process is omitted or added so as to improve the process; and (4) It is possible to compare the environmental information between different regions. For example, when the same device is employed in factories located in Japan and another country, it is possible to collect in units of products the environmental load data of each product in each factory. Accordingly, it is possible to analyze problems caused by a regional difference, thereby improving the process and reducing the environmental load.

TFD Element

Figure 9:
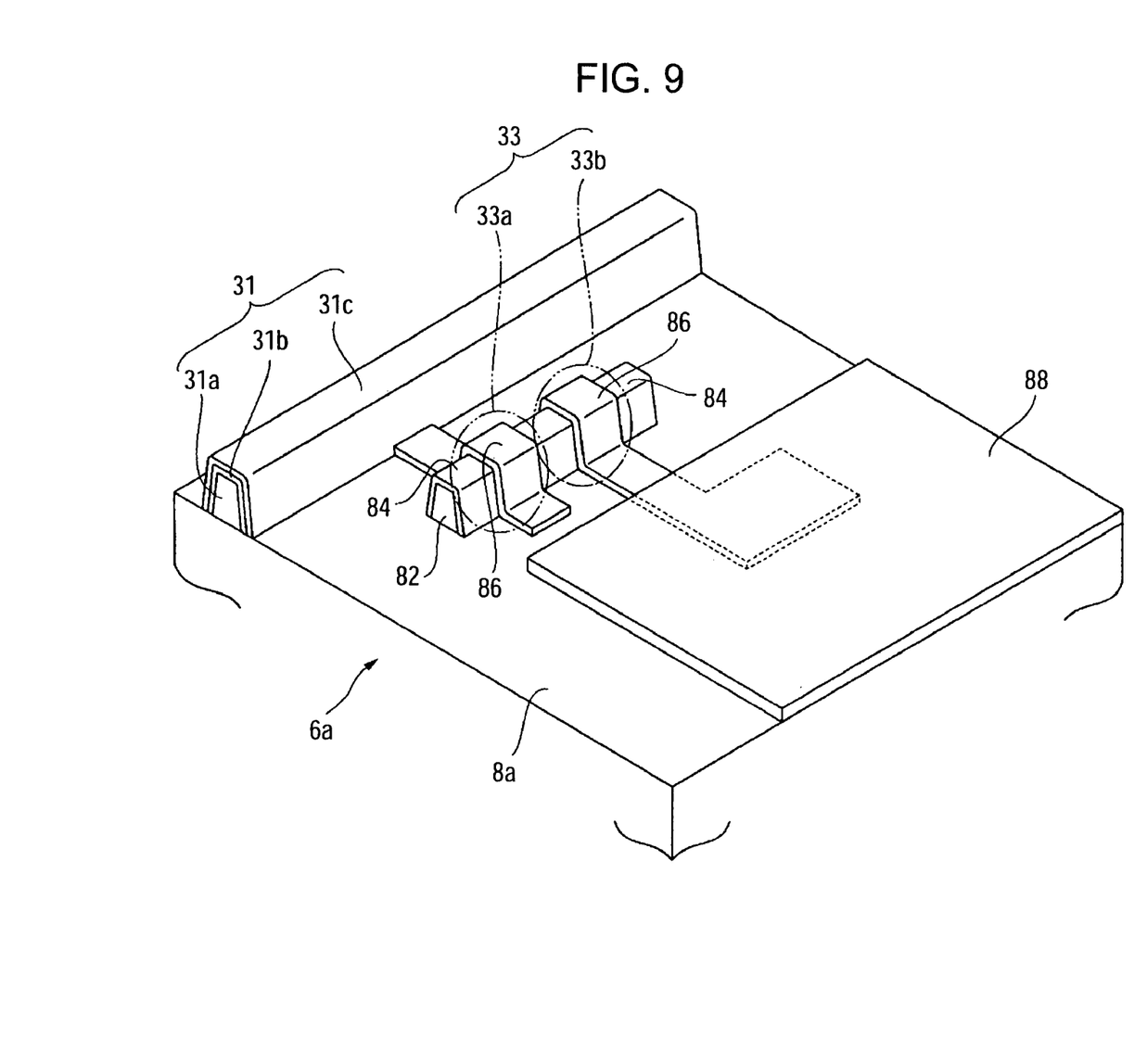
FIG. 9 is a perspective view illustrating a general construction of a TFD element.

The TFD element, which is a non-linear resistor, has been manufactured using the above-mentioned TFD element manufacturing system. The TFD element is manufactured by using the manufacturing process according to the flow chart shown in FIG. 4. Since the manufacturing process is well-known in the related art, a detailed description thereof will thus be omitted herein. FIG. 9 is a perspective view of the TFD element. As shown in FIG. 9, each TFD element 33 is formed by connecting a first TFD part 33a and a second TFD part 33b to each other in series and a back-to-back structure is adopted. The TFD element 33 as shown in FIG. 9 has a stacked structure of a first metal layer 82 (Metal)—an insulating layer 84 (Insulator)—a second metal layer 86 (Metal), that is, a MIM structure, and has a non-linear voltage-current characteristic. In the TFD element 33, the first metal layer 82 is made of TaW, the insulating layer 84 is formed of an anodized film, and the second metal layer 86 is made of Cr (Chrome). In FIG. 1, the second metal layer 86 of the first TFD part 33a is extended from a third layer 31c of a line wire 31. A dot electrode 88 is formed to overlap with an edge of the second metal layer 86 of the second TFD part 33b. That is, as shown in FIG. 1, the second metal layer 86 is formed to contact a part of a surface of the pixel electrode 88. An electrical signal flows from the line wire 31 toward the pixel electrode 88. Accordingly, in the first TFD part 33a, the electrical signal flows in a sequence of the second metal layer 86→the insulating film 84→the first metal layer 82. On the other hand, in the second TFD part 33b, the electrical signal flows in a sequence of the first metal layer 82→the insulating film 84→the second metal layer 86→the pixel electrode 88.

Electro-Optical Apparatus

Next, a liquid crystal display device including the TFD element, which is manufactured by the above-mentioned TFD element manufacturing system, will be described with reference to the drawing. That is, the liquid crystal display device according to the present embodiment uses the TFD element as a switching element for driving each pixel.

Figure 10:
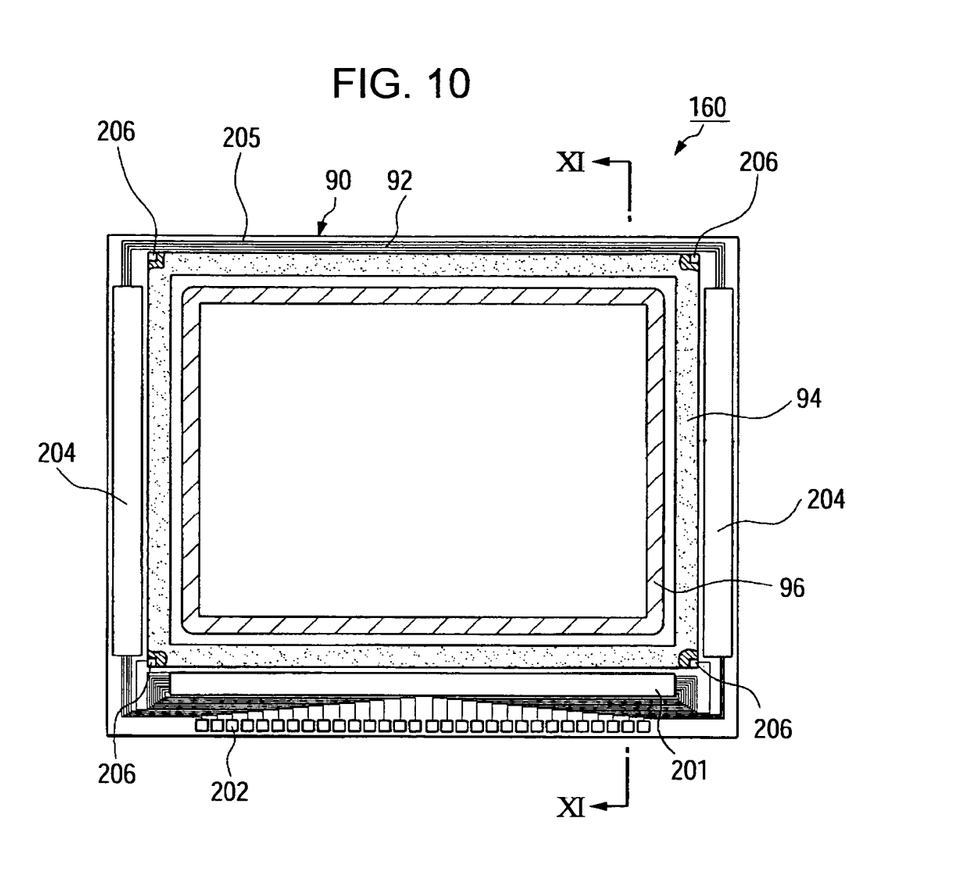
FIG. 10 is a plan view illustrating a general construction of a liquid crystal display device.
Figure 11:
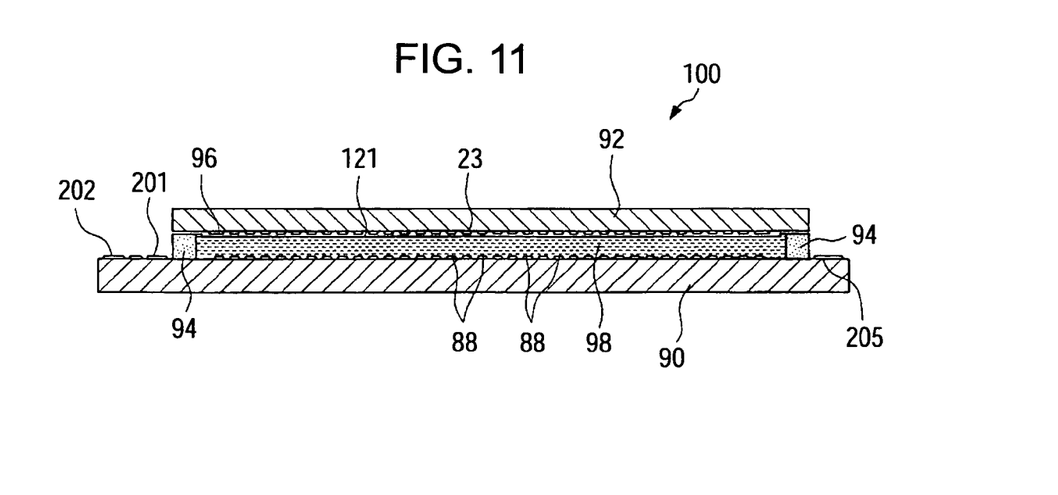
FIG. 11 is a cross-sectional view of the liquid crystal display device taken along the line XI-XI of FIG. 10.

FIG. 10 is a plan view of a liquid crystal display device according to an embodiment of the invention, which is seen from a counter substrate side. FIG. 11 is a cross-sectional view taken along the line XI-XI of FIG. 10. In order to illustrate each layer or each member so as to be easily recognized in each drawing, each layer or each member is drawn in a different scale.

In FIGS. 10 and 11, a liquid crystal display device (electro-optical apparatus) 160 according to the present embodiment is configured such that a TFT array substrate 90 and a counter substrate 92 are joined with a sealing material 94, which is a photo-curable adhesive, and liquid crystal 98 is filled into and retained in a region surrounded by using the sealing material 94. The sealing material 94 is formed in a closed frame shape in a region within the substrate surface, and is configured to have no liquid crystal inlet or traces of sealing.

Inside the region formed by using the sealing material 94, a boundary line 96 made of a light-shielding material is formed. Outside the sealing material 94, a data line driving circuit 201 and mounting terminals 202 are formed along one side of the TFT array substrate 90, and scanning line driving circuits 204 are formed along two sides adjacent to the one side. On the remaining side of the TFT array substrate 90, a plurality of wires 205 is provided to connect between the scanning line driving circuits 204 provided on both sides of an image display region. Moreover, on at lease one of the corners of the counter substrate 92, intra-substrate conductive materials 206 are provided to electrically conduct between the TFT array substrate 90 and the counter substrate 92. A plurality of pixel electrodes 88 is formed in a matrix shape inside the TFT array substrate 90 (not shown). On the other hand, a narrow and long stripe electrode 23 is formed inside the counter substrate 92. A TFD element 33, which is a switching element, is connected to each pixel electrode 88 (not shown).

In the liquid crystal display device 160, a retardation plate, a polarizer, or the like is disposed in a predetermined direction according to the liquid crystal 98, that is, according to an operation mode, such as TN (Twisted Nematic) mode, C-TN mode, VA mode, or IPS mode, or a normally white mode/normally black mode, which is not shown here.

Moreover, in the liquid crystal display device 160 for color display, for example, color filters of red (R), green (G), and blue (B), together with their protective films, are formed on corresponding regions of the counter substrate 92 which face each of the pixel electrodes 88 of the TFT array substrate 90.

Electronic Apparatus

An example of electronic apparatus according to an embodiment of the invention will now be described.

Figure 12:
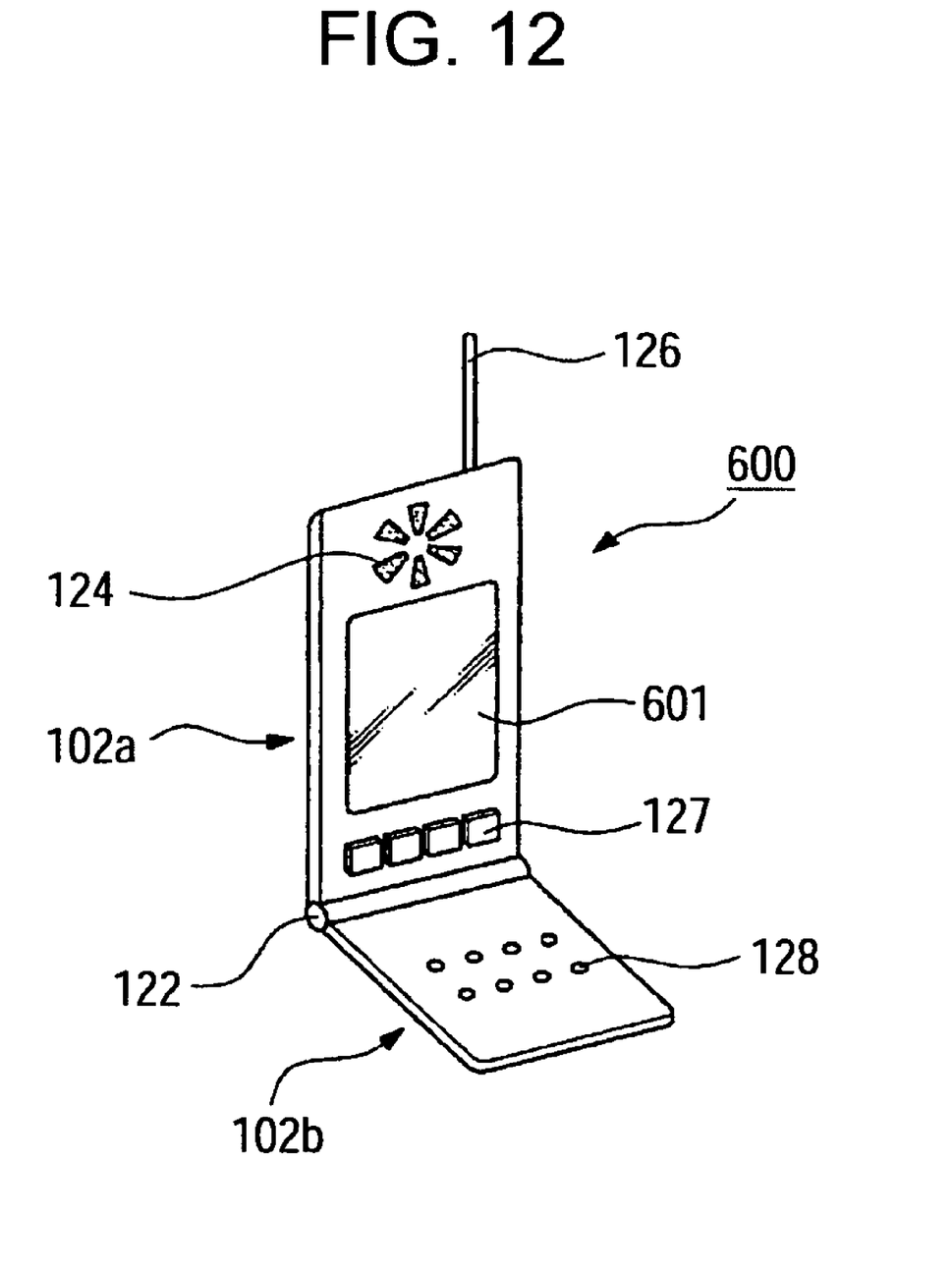
FIG. 12 is a plan view of a mobile phone that is an example of an electronic apparatus.

FIG. 12 is a perspective view of an example of a mobile phone equipped with a liquid crystal display device having the above-mentioned TFD element as a switching element. FIG. 12 shows a mobile phone, which is an example of the electronic apparatus according to an embodiment of the invention. The mobile phone 600 includes a first body 101a and a second body 102b, which is configured to be folded with respect to a hinge 122. On the first body 102a, a liquid crystal display device 601, a plurality of buttons 127, a receiving set 124, and an antenna 126 are provided. On the second body 102b, a transmitting set 128 is provided.

Even though the electronic apparatus according to the present embodiment has a liquid crystal display device, it may have other electro-optical apparatuses, such as an organic EL (electroluminescence) display device, a plasma display device, and the like.

The TFD element manufactured by using the TFD element manufacturing system according to the present embodiment can be output to various electronic apparatuses other than the mobile phone. For example, the electronic apparatus may be output to a liquid crystal projector, a personal computer (PC) and engineering workstation (EWS) for multimedia, a pager, a word processor, a television, a view-finder type or a monitor direct-view type videotape recorder, an electronic pocket book, an electronic calculator, a car navigation device, a POS terminal, an apparatus equipped with a touch panel, and the like.

According to an electronic device, such as a TFD element, an electro-optical apparatus, such as a liquid crystal display device, and an electronic apparatus, such as a mobile phone, in accordance with the present embodiment, since they are manufactured by the above-mentioned TFD element (electronic device) manufacturing system, it is possible to optimize manufacturing process management. Accordingly, it is possible to efficiently manufacture an electronic device, an electro-optical apparatus, and an electronic apparatus.

It should be understood that the invention is not limited to the above-mentioned embodiments, but can be changed without departing from the scope of the invention. In addition, a combination of the above-mentioned embodiments can be made without departing from the scope of the invention.

For example, even though the above-mentioned embodiment describes that the IC tag 30 is mounted on the flow label 28 which accompanies the lot L, but the above-mentioned embodiment is not limited thereto. If the IC tag 30 can make a local area communication with the radio module 14 of the etching device 80, the IC tag 30 can be mounted anywhere. In more detail, a jig which carries the lot L is an example.

In addition, even though the measured environmental load data of each processing unit is stored in the IC tag 30 in the above-mentioned embodiments, a storage medium such as an IC card may be employed if it can make a local area communication with the radio module 14 of the etching device 80 and store the received information. In addition, it is possible to store the environmental load data for each processing unit, which is measured in units of lots, in a plurality of IC tags 30.

In addition, even though the wattmeter 16 for measuring the 'power consumption', which is as an example of the environmental load data, in each processing unit of each lot L is provided in the above-mentioned embodiments, the invention is not limited thereto. For example, a water gauge which measures the amount of the consumed water, and a chemical gauge, which measures the amount of the consumed chemicals, may be provided in each processing unit. Accordingly, it is possible to analyze the process or the like in many respects.

What is claimed is:

1. A system for manufacturing an electronic device, comprising:
    a processing unit that processes a plurality of lots each having a plurality of work pieces, the processing unit including:
    a time measuring unit that measures a processing time required to process each lot of work pieces;
    an environmental information measurement module that measures environmental information corresponding to the processing time of each lot; and
    a communication module that transmits and receives; and
    a work information management unit that communicates with the communication module of the processing unit, the work information management unit receiving the processing time and the environmental information of the work pieces of the lot from the communication module of the processing unit, the work information management unit having a storage module corresponding to each lot, the storage module storing the processing time and the environmental information of the work pieces of the lot from the communication module.

2. The system for manufacturing an electronic device according to claim 1,
    wherein the storage module of the work information management unit stores unique lot identification information, and work number information concerning the plurality of work pieces stored in the lot.

3. The system for manufacturing an electronic device according to claim 1,
    wherein the processing unit includes sensors which are provided at a carry-in inlet and a carry-out outlet to detect that the work pieces are carried in and out.

4. The system for manufacturing an electronic device according to claim 3,
    wherein the communication module of the processing unit detects, by using one of the sensors, that the lot is carried into the processing unit and transmits work detection information to the work information management unit, and
    the work information management unit receives the work detection information and transmits the lot identification information and the work number information to the processing unit.

5. The system for manufacturing an electronic device according to claim 3,
    wherein the processing unit includes a counter that counts the number of work pieces processed,
    the communication module of the processing unit detects, by using one of the sensors, that a last work piece of the lot is carried out from the processing unit, and transmits the lot identification information, the work number information, the environmental information, and the processing time to the work information management unit, and
    the work information management unit receives, from the communication module, and stores, in the storage module, the lot identification information, the work number information, the environmental information, and the processing time.

6. The system for manufacturing an electronic device according to claim 1,
    wherein the environmental information measurement module of the processing unit includes at least one of a wattmeter that measures power consumption in units of the lots in the processing time, a water gauge that measures an amount of consumed water, and a chemical gauge that measures an amount of consumed chemicals.

7. The system for manufacturing an electronic device according to claim 1,
    wherein the processing unit includes a plurality of processing units that perform the same or different processes.

8. The system for manufacturing an electronic device according to claim 1,
    wherein the work information management unit is included in a flow label or a jig which is affixed to each lot.

9. A method of manufacturing an electronic device using the system according to claim 1.

10. An electronic device which is manufactured by the method according to claim 9.

11. An electro-optical apparatus which includes the electronic device according to claim 10.

* * * * *